Aug. 10, 1965

H. F. WELSH 3,200,385

MAGNETIC DRUM RECORDER INCLUDING A LANDING TRACK

Filed April 27, 1960

2 Sheets-Sheet 1

INVENTOR.

HERBERT FRAZER WELSH

Fred Fisher

ATTORNEY

Aug. 10, 1965 H. F. WELSH 3,200,385

MAGNETIC DRUM RECORDER INCLUDING A LANDING TRACK

Filed April 27, 1960 2 Sheets-Sheet 2

INVENTOR.
HERBERT FRAZER WELSH
BY Fred Fisher
ATTORNEY

United States Patent Office 3,200,385
Patented Aug. 10, 1965

3,200,385
MAGNETIC DRUM RECORDER INCLUDING A LANDING TRACK

Herbert Frazer Welsh, Philadelphia, Pa., assignor to Sperry Rand Corporation, New York, N.Y., a corporation of Delaware Filed Apr. 27, 1960, Ser. No. 24,950
10 Claims. (Cl. 340—174.1)

Figure 1:
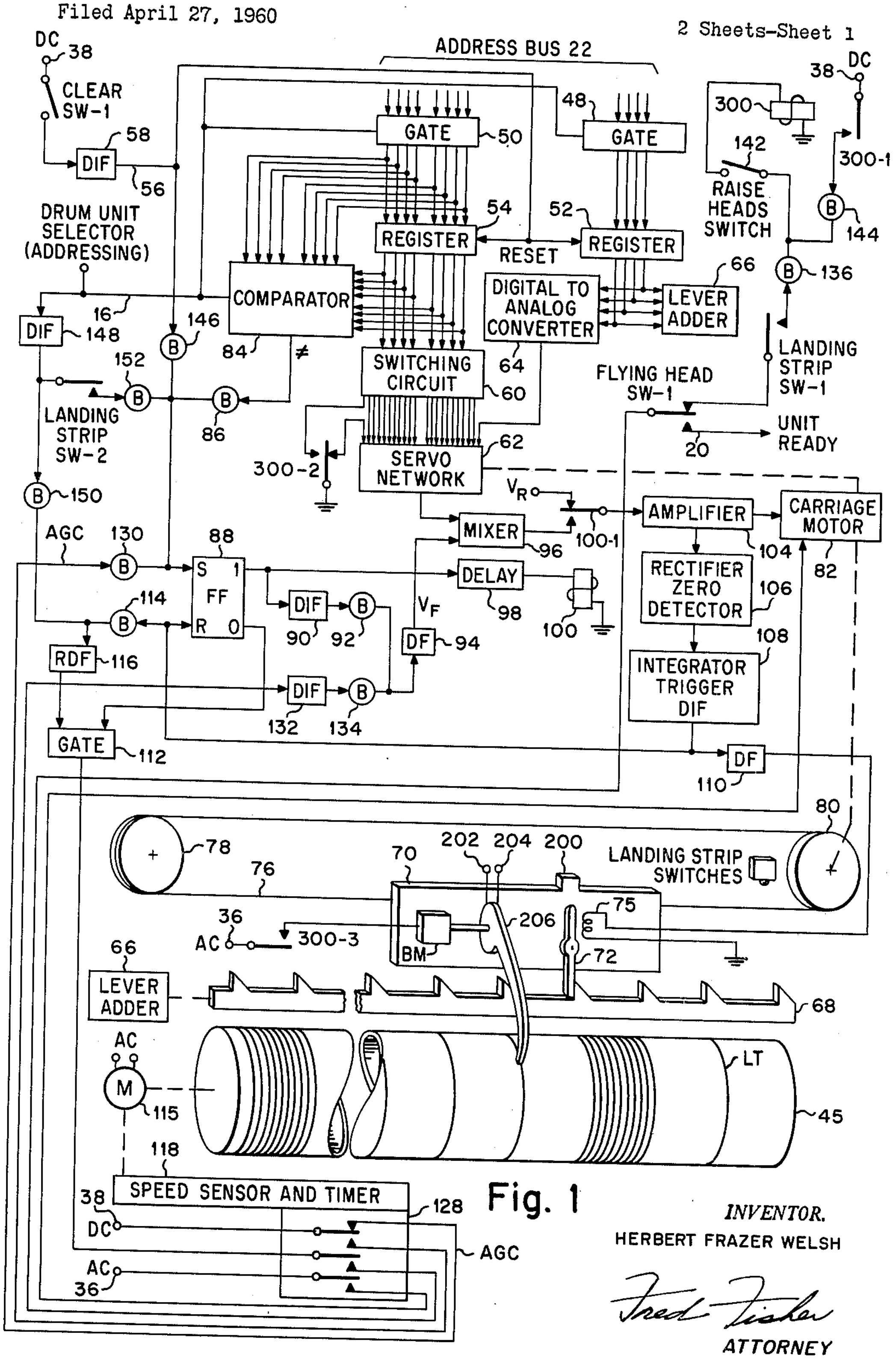

This invention relates to landing tracks, and in particular relates to circumferential areas on a magnetic drum which are reserved exclusively for the lowering and raising of a flying magnetic head in engagement thereon.

Information can be recorded upon or read from a magnetic drum, at any one of a number of magnetic tracks about the circumference of the drum, by a flying magnetic head. During a reading or recording operation, the head is separated from the drum by the pressure of a thin film of air upon which the head floats. The rotating magnetic drum disturbs the ambient air to create a greater pressure near the surface. However, when a flying head is lowered from a retracted ("off") position into a flying ("normal operation") position, the head passes through a transition zone. One characteristic of this zone is that of instability, wherein a slight disturbance can cause the head to strike the drum with a resulting impairment of the recording surface. When a head rests or floats in a flying position, the system is stable. Whenever the drum is struck or hit by a head, the magnetic surface of the drum can be damaged to such an extent that the damaged area is undesirable for the recording of information thereon.

In order to overcome this problem of instability during initial flight, there is established a landing track on the magnetic drum, preferably at one end thereof. This landing track is not used for the recording of information and, thus, if the head should accidently strike the drum, at the landing track, no damage is done to information recorded thereon. In accordance with one embodiment of this invention, head flight is initiated over the landing track. If, when flying over the drum during a recording or reading operation, a hit should occur (a contact between the head and drum), the head is lifted or retracted away from the drum and is returned to the landing track, flight is later re-established, and the head is returned to the flying position.

It is an object of this invention to provide a novel magnetic drum having a landing track thereon.

Another object of this invention is to provide a novel magnetic drum having an area for the exclusive purpose of initiating the flying of a magnetic head.

Still another object of this invention is to provide a novel recording medium having a circumferential area reserved exclusively for the initial engagement of a transducer thereon.

It is another object of this invention to provide a novel magnetic recording medium having information and non-information bearing tracks thereon.

It is the further object of this invention to provide a novel system for recording information wherein a magnetic head is brought into flying engagement with the magnetic drum at a non-information bearing track on said drum.

In accordance with this invention, there is provided a magnetic drum having a plurality of information tracks and a non-information track about the circumference of said drum. A magnetic head, which is adapted to be retracted away from said drum or be brought into flying engagement with the drum, is adapted to be translated along the length to the drum in accordance with an information or addressing signal. The head, upon receipt of an address and coincident with the rotation of the drum at the proper speed, can be brought into flying engagement with the drum only when the head is at the landing track. When the head is in flying engagement with the landing track, the head can be then translated to the address track for recording or reading data at that track.

Figure 2:
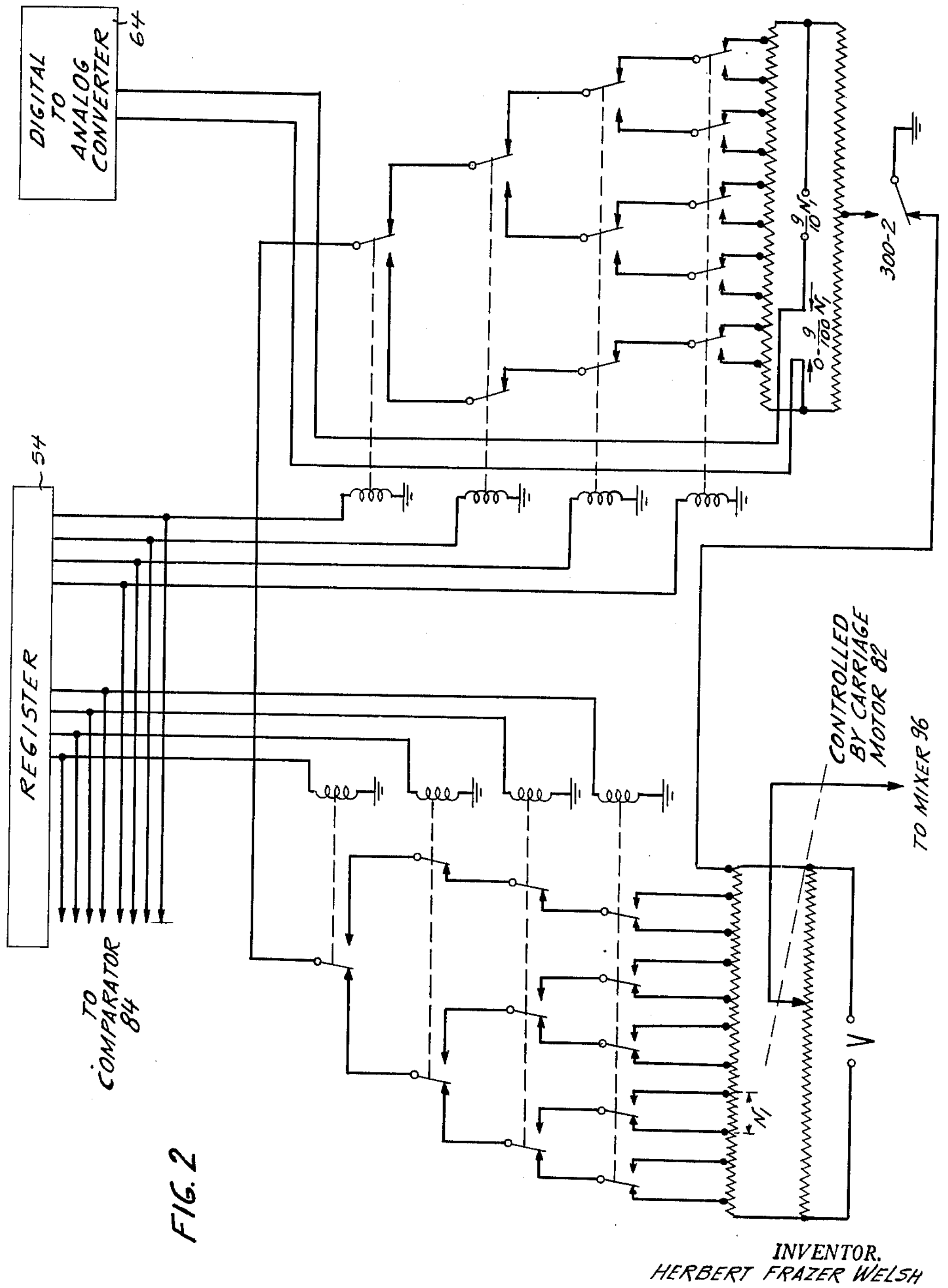

The novel features of this invention, and other objects and advantages thereof, together with its organization and method of operation will become more apparent from the following description when read in connection with the accompanying drawings, in which FIG. 1 is a block diagram of an embodiment of this invention; and FIG. 2 is a diagram, in greater detail, of the switching circuit and servo network illustrated in FIG. 1.

Referring to FIG. 1, there is shown a pair of gates 48, 50 which receive an address from an address bus 22. In accordance with one embodiment of the invention, the address can take a form of three decimal digits ranging from 000 to 999 to represent one particular information track from the 1000 information tracks on the drum. Each decimal digit would be represented in binary coded form, which form can be either straight binary coded decimal or binary coded decimal excess 3, as desired. Normally, assuming that the code is represented as a straight binary coded decimal, the representation for the information track designated 473 would appear on the 12 address line 22 in a binary code as 0100–0111–0011. One portion of the address, for example the most significant digits 4 and 7, is coupled to the gate 50; the remaining portion of the address, digit 3, is coupled to the gate 48.

An enabling signal from a drum unit selector (addressing) line 16 is applied to each of the gates 48, 50. This signal like the address selection signals on the bus 22 may come from a digital computer not shown. Each of the gates 48, 50 provides output signals, corresponding to their respective input signals, upon the presence of an enabling signal from the drum unit selector (addressing) line 16. The outputs of the gate 48 are coupled to a register 52, such as a conventional flip-flop register. The register 52 provides a coded output signal which corresponds to the signal read into the register. The outputs of the gate 50 are coupled to a register 54 (similar to the register 52) which sets the register in accordance with the signals provided at the output of the gate 50. Both registers 52, 54 are adapted to be reset by a "clear" signal on a line 56, which signal can be generated by the closing of a switch clear SW–1 to complete a circuit from a direct current bus 38 through a differentiator 58 to provide a "clear" pulse on the line 56. The output of the register 54, which comprises eight leads containing binary information, is connected to a switching circuit 60 which switches, by means of relays or other switching devices, the binary information present at its input to an enabling level on one line of each of the two sets of ten lines at its output. The switching circuit 60 converts the binary coded data at its input into decimal coded data at its output.

The switching circuit 60 provides an output on its output lines corresponding to its input signal only upon the application of a grounding lead which is achieved by having one lead from the switching circuit 60 coupled to a normally open contact of a relay pole 300–2, which pole has its arm connected to a point of reference potential, such as ground. The outputs of the switching circuit 60 are connected to a servo network 62. In addition, the normally closed contact of the relay pole 300–2 (i.e. that contact which is closed when the relay pole 300 is not energized) is connected to the servo network 62. The output of the least significant digits register 52 is coupled to a digital to analog converter 64. The digital to analog converter 64 converts to binary coded information present at its input into an analog signal at its output, the output being coupled to the servo network 62.

The output of the register 52 is also coupled to a lever adder 66 which acts as an electrical to mechanical transducer for translating the electrical signal present at its input into mechanical motion at its output to actuate a rack 68. The specific details of a lever adder is described in greater detail and claimed in a co-pending application entitled "Lever Adder," filed February 23, 1960, S.N. 10,374, now Patent No. 3,071,319, by the same inventor and assigned to the same assignee of the present application.

A carriage 70, which carries the head 206, has associated therewith a pawl 72. A suitable carriage is shown and described in a co-pending application by Franz X. Kanamuller, entitled "Magnetic Head Positioning System," S.N. 5,873, filed February 1, 1960, now Patent No. 3,105,964, and assigned to the assignee of the present invention.

The pawl 72 is mechanically retractable by sliding it up the incline of a tooth of the rack 68 and electrically actuable to drop into engagement with the rack by energizing a pawl actuator or pawl coil 75. The carriage 70 is moved by means of a drive cable 76 which is carried by a pair of pulleys 78, 80 and driven by a reversible carriage motor 82. The movement of the carriage 70 along the distance between the two pulleys 78, 80 moves the associated head 206 along the length of the drum 45. The carriage motor 82 is mechanically coupled to the servo network 62 to operate an electric potentiometer therein, as shown in FIG. 2. Therefore, the servo network 62 has two sets of signals present at its input; first, a signal from the carriage motor which indicates where the carriage is located; second, an electrical signal to indicate the desired carriage location obtained from the circuits 60 and 64. The servo network 62 provides an output when there is an inequality at its inputs. The servo network 62 operates in a normal manner whereby the characteristic of the output signal (such as magnitude, polarity, and phase) is such as to direct the carriage motor 82 to search for the desired location.

The register 54, as most conventional registers, requires a finite time for the register to change its state upon the application of subsequent input signals applied thereto. In other words, the output of the register 54 is slightly delayed from its input signal. Advantage is taken of this slight delay to compare the new address with the old to see if a change is indicated. For this purpose, the output of the gate 50, and the output of the register 54 before it changes, are coupled to the inputs of a comparator 84 which receives an enabling signal from the drum unit selector (addressing) line 16. The comparator 84 provides an output at its output terminal in coincidence with the enabling signal and unequal signals at the input terminals. The output from the comparator 84 is coupled via a buffer 86 (which can form part of an isolating or "or" circuit) to the set terminal of a flip-flop 88.

The flip-flop 88 can be a conventional bistable circuit, such as the Eccles-Jordan type. The flip-flop 88, upon being set by an enabling signal at the set terminal S, provides an enabling signal at its "1" output terminal and continues to provide an enabling signal at that "1" terminal until an enabling signal is subsequently applied to the "reset" terminal R of the flip-flop 88, at which time the flip-flop removes the enabling signal from its "1" terminal and provides an enabling signal at its "0" terminal. The "1" terminal of the flip-flop 88 is coupled via a differentiator 90 through a buffer 92 to the input of a delay-flop 94. The set output terminal of the delay-flop 94 is coupled to one terminal of a mixer 96. The delay-flop 94, also termed a "one-shot" or monostable multivibrator, provides an output at its set output terminal for a fixed duration upon the application of an enabling signal present at its input terminal. The output of the servo network 62 is coupled to a second terminal of the mixer 96. The mixer 96 combines the two signals present at its input to provide an output signal therefrom. The mixer 96 can be a resistance adder, a multi-grid electron tube, or other suitable combining network.

The "1" output terminal of the flip-flop 88 is further coupled through a delay circuit 98 to one terminal of a relay coil 100 which has its other terminal coupled to a point of reference potential, such as ground. The relay coil 100, when energized, actuates a relay pole 100–1. The output of the mixer 96 is coupled to the normally open contact of the relay pole 100–1. The arm of the relay pole 100–1 is coupled to an amplifier 104 which has an output connected to operate the carriage motor 82. The normally closed contact of the relay pole 100–1 is coupled to receive a potential $V_R$ to provide a reverse torque to the carriage motor 82 to cause a force to be applied to the carriage 70 towards the right, as shown in the figure. The delay-flop 94 provides an output signal $V_F$ at its output when the delay flop 94 is set. The voltage $V_F$ has such a characteristic as to provide a forward torque to the carriage motor 82 to cause the carriage 70 to have a force applied thereto to the left. The carriage motor 82 and amplifier 104 can be either A.C. or D.C. operated: when the motor and amplifier are D.C. operated, the voltages $V_R$ and $V_F$ are of opposite polarities; when the carriage motor and amplifier are A.C. operated, the voltages $V_R$ and $V_F$ are of opposite phases. The output of the amplifier 104 is coupled to a rectifier and zero detector 106. The zero detector 106 provides an output therefrom when no input signal is applied thereto. The output terminal of the zero detector 106 is coupled to an integrator, trigger, and differentiator circuit 108 which provides an output pulse which is delayed from an input signal applied thereto. This output pulse is coupled to the reset terminal R of the flip-flop 88 and also to the input terminal of a delay-flop 110. The set output terminal of the delay-flop 110 provides a signal at its output for a short interval which is coupled to actuate the pawl actuator 75. Upon actuation, the pawl actuator 75 actuates the pawl 72 so that the pawl 72 is engaged between the teeth of the rack 68. The "0" output terminal of the flip-flop 88 is coupled to one input of a two-input "and" gate 112. The output of the differentiator 108 is further coupled by means of a buffer 114 to the set input terminal of a resettable delay-flop 116. A signal is present at the output terminal of the resettable delay-flop 116 when no signal has been applied at its input terminal for a previous predetermined period. The output of the resettable delay-flop 116 is coupled to the second input of the "and" gate 112.

Alternating current is applied to operate the drum motor 115 which drives the drum 45. The drum motor 115 operates a speed sensor 118 which, when the drum 45 is rotating at full speed, couples alternating current to a timer 118 which, after a fixed interval, actuates its associated switches 128. The speed sensor 118 can be a tachometer-operated switch which is actuated when the drum 45 is operating at a predetermined speed.

Direct current is applied via the D.C. bus 38 to the arm of the upper switch of the switches 128. The normally closed contact of the upper switch is coupled via a buffer 130 to the set input terminal S of the flip-flop 88. The normally open contact of the upper switch is connected via a differentiator 132, through a buffer 134, to the input terminal of the delay-flop 94. The output of the gate 112 is connected to the arm of the center switch of the set of switches 128. The central switch contact is connected to a flying head switch SW–1. The flying head switch SW–1 is coupled to the head 206, so that, when the head 206 is flying, the switch completes a circuit onto the output line 20 to provide a "unit ready" signal to a computer (not shown). Alternating current, by means of the bus 36, is connected to the arm of the lower switch of the set of switches 128. The bottom switch contact is coupled to an enabling terminal of the carriage motor 82. The switch flying head SW–1, when the head is not flying, couples a circuit from the output of the gate 112 through the middle switch of the set of switches 128 to one contact of a landing strip switch SW–1, which is closed when the head 206 is at a landing track. The other contact of the landing strip switch is connected by means of a buffer 136 to one contact of a raise heads switch 142. The other contact of the raise heads switch 142 is coupled to one terminal of a relay coil 300 which other terminal is coupled to a point of reference potential, such as ground.

The carriage 70, when the head 206 is at the landing track LT, causes the landing strip switches to be actuated by a protrusion 200 on the carriage, which is positioned to actuate miniature switches when the head 206 is at the landing track LT.

As illustrated in FIG. 1, the raise heads switch 142 is a manually operated switch. However, the head 206 can be raised automatically by suitable means (not shown) which, for the purposes of this disclosure, can be illustrated as the switch 142. Such automatic means can include a hit detector which detects various types of hits by the magnetic head upon a drum. Such a hit detector is described in greater detail and claimed in a co-pending application assigned to the present assignee and filed by Beverly L. Crew, S.N. 12,585, filed March 3, 1960.

The specific details of the positioning mechanism is described in greater detail and claimed in a co-pending application entitled "Positioning Mechanism," filed by Marvin Jacoby, S.N. 23,529 on April 20, 1960, and assigned to the assignee of the present application.

The relay 300 has associated therewith three relay poles: 300–1, 300–2, and 300–3. The arm of the relay pole 300–1 is connected to a source of direct current voltage by means of the bus 38. The normally open contact of the pole 300–1 is coupled, via a buffer 144, to the raise heads switch 142. As stated above, the arm of the relay pole 300–2 is connected to a point of reference potential, such as ground. The normally closed contact of the pole 300–2 is connected to a landing strip tap in the servo network 62. The normally open contact of the pole 300–2 is connected to the switching circuit 60. Alternating current is supplied, via the bus 36, to the arm of the pole 300–3, whose normally open contact is connected to a bail motor and bail solenoid BM.

The output of the differentiator 58, via the line 56, in addition to being connected to the reset terminals of the registers 52 and 54, is connected through a buffer 146 to the set terminal S of the flip-flop 88. The signal on the drum unit selector (addressing) line 16, in addition to the connections, described above, to the gates 48 and 50 and the comparator 84, is connected to a differentiator 148. The output of the differentiator 148 is connected through a buffer 150 to the input terminal of the resettable delay-flop 116. In addition, the output of the differentiator 148 is connected through a normally open landing strip switch SW–2 to a buffer 152 which is coupled to the set input terminal S of the flip-flop 88. The landing strip switches SW–1 and SW–2 constitute the landing strip switches which are actuated when the head 206 is at the landing track LT.

When the magnetic head is co-operating with an information track, a reading or recording operation can be performed, as desired. Signals can be applied to or read from the terminals 202, 204 of the head 206 in accordance with the operation. The magnetic head 206 contains an erase coil (not shown, for simplicity of disclosure).

Specific examples of storage, capacity, access time, etc. are set forth in the Jacoby application, supra. Various engineering embodiments can be made without departing from the spirit of this invention.

The head 206 is air-floated on the drum surface to provide extremely small stable head-drum clearance. The head 206 is supported and moved to the desired information track by the positioning mechanism which includes the movable carriage 70 which is approximately positioned by a drive cable 76 and pulley arrangement 78, 80 driven by a closed loop electronic servo network 62. Precision in the final positioning of the carriage 70 (and the head 206) is obtained by making use of the notched (saw-toothed) positioning bar or rack 68 which extends the full length of the carriage travel. The notches on the rack 68, coacting with the mechanical pawl 72 on the carriage 70, determine the final position. The high density of the track positions and a possible servo system error make it impractical to provide a notch for each track position. Instead, the rack has one notch for every *n* positions. The number of positions *n* can be any suitable number desired, such as ten, as set forth in the Jacoby application. The rack 68 is moved to any intermediate position desired which is accomplished by means of solenoid actuated levers termed a lever adder 66, the output of which is a mechanical displacement equal to the sum of the individual lever movements.

The drum 206 has one thousand information tracks, so that three decimal digits are desired to specify an address. These decimal digits are presented to the gates 48, 50 in a four-bit code and are sent in parallel from the computer over the twelve wire address bus 22.

At the same time that the computer sends out a new address over the address bus 22, it also energizes the drum unit selector wire 16, thus enabling only one chosen drum unit to receive the new address information. In one embodiment, the duration of both the address signal and the drum unit selector signal is approximately 15 milliseconds.

The registers 52 and 54 serve as a memory for the address.

As mentioned previously, positioning generally consists of two phases: one is the positioning of the carriage to the desired one of the one hundred teeth on the rack 68; the other is to move the rack 68 to one of the ten positions into which a tooth is divided. The register 52 which stores the third or least significant digit energizes solenoids which actuate the lever adder 66. The register 52 is connected to the digital-to-analog converter 64 which is connected to the servo network 62 to provide a voltage signal to compensate for the physical displacement of the rack 68.

The register 54 provides two output signals, on four lines each: a most significant decimal digit output signal, and a least significant decimal digit signal. The most significant decimal digit signal is coupled to the switching circuit 60 which, by means of a relay tree, produces ten output wires which are coupled to taps on a set of resistors which shunt a main positioning potentiometer (FIG. 2) in the servo network 62. A voltage source is connected across the potentiometer. The stem of the relay tree is connected to the stem of a second relay tree. This second relay tree is coupled to receive the least significant decimal digit signal from the register 54. The ten outputs of this second relay tree are connected to ten equally spaced taps on a second potentiometer across which is a voltage corresponding to the voltage between adjacent taps on the main potentiometer. The mid-point of the second potentiometer is coupled to a point of reference potential, such as ground, and, in this manner, the wiper arm of the main potentiometer can be made to seek any one of a hundred different positions. The error signal, which is a function of the displacement of the wiper arm from null and therefore a function of the distance that the carriage is located from its final desired position, is fed into the mixer 96, through the normally open contact of the pole 100–1, to drive the amplifier 104 which supplies power to the reversible direction motor 82. When the servo system is not positioning, the amplifier 104 output is such as to apply a torque to the servo motor 82 which forces the pawl 72 on the carriage 70 back against the perpendicular face of a tooth on the rack 68.

When positioning to a new address, several events happen in sequence: First, the pawl is retracted, which is caused by moving the carriage forward to drive the pawl up the incline of a sawtooth on the rack 68 to throw it over its mechanical center. This forward motion is achieved by applying, for a short period, a steady state signal (from the delay flop 94) to the mixer 96 of sufficient amplitude and of proper polarity to override any error signal which may be present. Subsequently, the steady state signal is removed, permitting the error signal to cause the carriage to servo to its desired position, within an accuracy of one tooth pitch. The pawl 72 is electrically dropped by means of the actuator 75. Finally, the servo amplifier 104 is disconnected from the error signal by the deactivation of the relay pole 100–1 and connected to a signal of such phase for causing the servo motor to bias the carriage against the perpendicular face of the tooth.

The delay element 98 insures that the pawl 72 is retracted prior to moving the carriage to a new location. The ≠ signal output from the comparator 84 sets the flip-flop 88. The "1" output of the flip-flop 88, by way of the delay flop 94, is applied to the mixer 96, overriding any error signal which may be present from the servo network 62, prior to the actuation of the relay pole 100 which actuates the pole 100–1. The delay element 98 therefore provides that the carriage motor acts to retract the pawl prior to its servo action in locating a new address.

In general, a new address usually calls for action by both the servo system and the lever adder. However, when the new address differs from the old address only in the units digit (i.e. the four lines of the address bus 22 which is connected to the gate 48), there is no need to use the servo system and considerable time is saved by not using the servo system. Thus, when a new address is received, the comparator 84 is probed to determine whether the register 54 has changed its state. If so, the comparator output lead (labelled ≠) generates a signal which indicates that the new carriage address is not equal to the previous carriage address. This output signal sets the flip-flop 88.

Assuming that the carriage address is the same as the previous carriage address, there is described hereinbelow a cycle of operation. The flip-flop 88 is in its reset state at the conclusion of the previous cycle. The "0" output of the flip-flop 88 applies a permissive signal on the "and" gate 112. The drum unit selector signal on the line 16 is differentiated by the differentiator 148, and by way of the buffer 150, has its leading edge trigger the resettable delay-flop 116 for a period of 100 ms. This operation removes the permissive signal by the resettable delay-flop 116 from the "and" gate 112, thus terminating the output from the gate 112, which output previously was signifying, via the line 20, that this paraticular drum unit was ready for use by the computer. The action of the resettable delay-flop 116 delays the "unit ready" signal to permit the lever adder 66 to come to equilibrium after being actuated. The lever adder 66 takes approximately 80 ms. to come to rest. Upon the recovery of the resettable delay-flop 116, after 100 ms., its permissive signal is again present at the gate 112 to thereby provide an output therefrom. The output of the gate 112 is coupled through the middle switch of the set of switches 128 which is associated with the speed sensor and timer 118 (which assures that the drums 44 and 46 are up to speed), through the lower contact of the flying head switch SW–1 which signifies that the heads are flying, and hence via the unit ready line 20 to inform the computer that this particular drum unit is ready for reading or recording. This operation assumes that the heads have already been lowered, the drums are up to speed, and that normal addressing operations are taking place. The description of initial starting is given hereinbelow.

When either of the two most significant decimal digits of a new address differs from the old address, the output of the comparator 84 provides a signal, via the buffer 86, to set the flip-flop 88. In addition, the drum unit selector (addressing) signal on the line 16 sets the resettable delay-flop 116 via the differentiator 148 and the buffer 150. The setting of the flip-flop 88 does two things: through the delay 98, the relay coil 100 is energized which transfers the arm of the relay pole 100–1, thereby disconnecting the amplifier 104 from the reverse torque voltage $V_R$ which removes the reverse torque from the carriage motor 82 and connects the amplifier 104 to the output of the mixer 96. The set output of the flip-flop 88, through the differentiator 90 and the buffer 92, sets the delay-flop 94 which applies a voltage to the mixer 96 for a period of 25 ms. of such polarity as to drive the carriage 70 forward and lift the pawl 72 over its mechanical center. When this signal from the delay-flop 94 is terminated at 25 ms., the mixer 96 remains connected to the error signal from the servo network 62 and the servo system seeks its null. An output from one of the stages of the amplifier 104 is fed through the rectifier and zero detector 106 which produces an output when the rectified amplifier output is within limited bounds of zero. Since there may be spurious zero signals, perhaps due to under-dampening of the servo system, the output of the zero detector 106 is fed into the integrator 108 (with a 50 ms. time constant) which assures that the carriage 70 has come to rest. The integrator is connected to a trigger circuit and differentiator, shown at 108, the output of which causes the pawl actuator 75 to be energized by means of the delay-flop 110, thus lowering the pawl 72 between a pair of teeth on the rack 68. The output of the integrator-trigger circuit 108 resets the flip-flop 88 which removes power from the relay coil 100, reversing the arm of the pole 100–1, causing the amplifier 104 to again be connected to the $V_R$ voltage source which produces a reverse torque in the carriage motor 82. The pawl actuator 75 is energized for a sufficient length of time to ensure that the pawl is mechanically stable in a lowered position. The output of the integrator-trigger circuit 108, via the buffer 114, triggers the resettable delay-flop 116 for another 100 ms., thereby assuring that the pawl 72 is safely against the perpendicular face of a tooth on the rack 68 and that all vibrations have been eliminated prior to the sending of a "unit ready" signal back to the computer via the line 20. Thus, the flip-flop 88 has been reset, and when the resettable delay-flop 116 recovers, a "unit ready" signal is given which takes the same path as described previously.

The flip-flop 88 is a slow acting circuit so that, when the flip-flop 88 is reset at the same time as the resettable delay-flop 116 is set, no voltage spike is present from the gate 112. In other words, the rise of the reset output of the flip-flop 88 is delayed from the reset input.

*Initial start*

Assuming that all power is off, the drum is stopped, and the head is lifted (which is automatically accomplished whenever power is removed), the carriage may be at any point along the drum and the pawl may be either raised or lowered.

In addition to the information tracks on the drum 45, the drum contains, at one end thereto and some distance away from the information tracks, an additional track which is termed the "landing strip" (LT). In normal operation, the head 205 can be lowered only when the carriage 70 is at the landing strip, thereby avoiding the risk of damage to the drum surface and to the information stored thereon, which otherwise would be inherent in the lowering of the head. Consequently, one purpose of this invention is to position the carriage 70 during the starting procedure, to the landing strip and then lower the heads into a "flying" position.

On the main potentiometer in the servo network 62, described above, there is an additional tap corresponding to the position of the landing strip (FIG. 2). The relay pole 300–2 switches between this landing strip tap and the switching circuit 60 to which the servo network 62 is normally connected. When the relay 300 is de-energized, the servo system when active seeks the landing strip; when the relay 300 is energized, the servo system seeks whatever address is stored in the register 54.

It is important that the drum 206 be up to desired speed, both from the point of view of successfully flying the head and because constant speed is desired for the proper reading and recording of data. This speed control is achieved by a regulated and monitored line voltage and frequency and by waiting a sufficient length of time after starting to insure that the drum is at full speed. A speed sensing element 118 is utilized to give an indication when the drum is approximately (i.e. 90%) up to speed. The speed sensor 118, when sensing the proper speed, triggers a timer 118 which permits another minute or so for full speed to be achieved. The drum 206 is independently motor driven by the motor 115 and contains its own speed sensor 118.

Alternating voltage can be turned on from an external control means. The alternating voltage is connected to the drum motor 115; it also turns on various heaters and blowers (not shown) and after a suitable delay, direct current is applied via the D.C. bus 38.

When direct current comes on, it turns on the various flip-flops and delay flops and it is desired that some of these flip-flops come on in a predetermined state. Therefore, one side of the grid returns (or the equivalent, if transistorized) of the flip-flop 88 is connected to direct current through the upper contact of the upper switch 128 associated with the timer 118. This assures that the flip-flop 88 is always turned on in the desired state. The line, marked AGC (automatic general clear), shown coming from the upper contact of the upper switch in the timer relay switches 128, is coupled to set the flip-flop 88 via the buffer 130.

Since it is desired that alternating current not be applied to the carriage motor 82 until the system is ready, the alternating current is coupled through one of the switches (lower switch) of timer relay switches 128.

When the timer 118 actuates its relay, indicating that the drum 206 is up to speed, the automatic general clear signal is removed, unjamming the flip-flop 88 and alternating current now becomes available for the servo system. In addition, direct current is coupled through the lower contact of the upper switch in the timer relay switches 128 to produce a pulse, via the differentiator 132 and the buffer 134, to trigger the delay flop 94. The output of the delay flop 94 supplies forward torque to the servo by means of the mixer 96, the pole 100–1 and the amplifier 104. Since the flip-flop 88 had been jammed by the automatic general clear signal to its "1" set state, the servo system goes through the usual steps in seeking a new address, except, however, the relay 300 has not yet been energized, thereby causing the servo network 62 to be connected to the landing strip tap of the main potentiometer instead of to the switching circuit 60. Thus, the carriage 70 seeks the landing strip track.

When the carriage 70 arrives at the landing strip track, the sequence of events described previously for a normal carriage address takes place. Eventually, a signal is generated by the gate 112, which passes through the center switch 128 at the timer 118, through the upper contact of the flying head switch SW–1 since the heads have not yet been lowered. The signal now passes through the landing strip switch SW–1 which is actuated by the carriage 70, by the protrusion 200 thus giving physical proof that the head 206 of the carriage 70 is actually at the landing strip track LT. The signal continues through the buffer 136 and the raise head switch 142, to pick up or energize the relay 300. After the relay 300 is initially energized, it is self-holding due to the relay pole 300–1 and the buffer 144. The energization of the relay 300 also actuates the pole 300–2 which transfers the servo network 62 from the landing strip to the switching circuit 60 and, in addition, actuates the pole 300–3 which permits alternating current on the bus 36 to energize the bail motor and bail solenoid BM, enabling the head 206 to lower. When the head 206 is lowered, the flying head switch SW–1 is actuated, which transfers the signal from the gate 112 to its lower contact and, hence, to the computer via the unit ready line 20, thereby indicating that the drum unit is ready to receive an address.

The operation and construction of the bail motor and bail solenoid BM is described in greater detail in the Kanamuller application supra.

*Manual switches*

*Raise heads switch 142.*—The raise heads switch 142 is a locking type switch in series with the coil of the relay 300. Activation of this switch immediately raises the head 206 by dropping out the relay 300, thereby cutting power to the bail solenoid and bail motor BM. When the raise heads switch 142 is activated (opened) while the carriage 70 is in transit between addresses, the carriage 70 returns to the landing strip. The head 206 is not lowered until the raise heads switch 142 is returned to its normal position. If the switch is opened when the carriage 70 is at rest, the head lifts but the carriage remains motionless. Returning the raise heads switch 142 to normal (closed) does not lower the head and the carriage 70 remains in the same position. The operation of the clear switch SW–1 brings the carriage 70 to the landing strip and lowers the head 206.

*Errors and failures*

*Hits.*—The contact of a head with the drum is termed a "hit". A "hit detector" which detects undesired contacts, is described in greater detail and claimed in the Crew application, supra. Effectively, a "hit" opens the raise heads switch 142, which supplies power to the relay coil 300, thereby raising the head 206. Should a significant hit occur while the carriage 70 is at rest, the head 206 raises, but the carriage 70 does not move, thus providing the opportunity to visually inspect the drum in the area where the carriage is presently located. Should the hit occur while the carriage 70 is in transit, the head 206 raises and the carriage 70 returns to the landing strip LT. In any event, in order to lower the head 206, the clear switch SW–1 should be actuated, thereby causing the carriage 70 to move to the landing strip, if not already there, and causing the head 206 to lower, placing the head in a flying position.

*Carriage over-travel.*—Failure in the servo system or failure to drop the pawl 72 when required may result in the driving of the carriage 70 to the end of the rack 68. "Crash" springs (not shown), which can safely cushion the worst possible impact, are provided at each end of the rack 68 to provide for this contingency. Switches (not shown) are provided at each end of the rack 68 to cut power to the motor 82. Following a crash, the switches are reset and a general clear signal is given by the actuation of the clear switch SW–1. The carriage is then moved to the landing strip LT where, during normal operation, the head is lowered and the unit ready signal is sent back to the computer.

The landing strip switch SW–2 receives, via the differentiator 148, a signal from the drum unit selector (addressing) line 16, and transmits that signal via the buffer 152 to set the flip-flop 88. The purpose for this is as follows: a "clear" signal on the line 56 clears the relay registers 52 and 54 to 000 and normally brings the carriage 70 to the landing strip. If the desired address which the computer 10 wishes to use is 000, then, when this address is sent to the drum unit there is no change in the comparator 84 output and no signal is given on the line to set the flip-flop 88. Conseqently, the carriage 70 would not move from the landing strip LT but for the fact that, in this circumstance, the drum unit selector signal is buffed to set the flip-flop 88 when the carriage is at the landing strip track.

In summary, during the initial start operation, the carriage 70 is moved to the landing track LT; the head 206 is lowered to "fly" over the drum 45; and, then, the carriage is moved to one of the thousand information tracks 000–999 in accordance with the address signal on the address bus 22.

Illustrated below are typical characteristics of a drum unit incorporating the features of this invention. Other characteristics may be used without digressing from its scope.

| Storage | Characters | Bits |
|---|---|---|
| Drum | 3 million | 21 million |
| Track | 3,000 | 21,000 |
| Sector | 120 | 840 |

*Information format*

| | | |
|---|---|---|
| Tracks per drum | | 1,000 |
| Sectors per track | | 26 |

*Drum parameters*

| | | |
|---|---|---|
| Length | in | 44 |
| Diameter | in | 24 |
| Speed | r.p.m. | 870 |
| Bit density per track | p.p.i. | 325 |

Various modifications can be made without departing from the spirit of applicant's invention. For example, more than one landing track can be used so that operating speed can be increased. In addition, other transducers and recording media can be used, such as electrostatic recording, or the use of discs for the recording of information.

It should be noted that, in the instant invention, all the recording tracks are independent of each other. That is, there is not merely one continuous track, such as a phonograph record, wherein positioning of a transducer, in the manner described above, can not take place. It is, therefore, desired that this invention be limited solely by the scope of the appended claims.

What is claimed is:

1. In combination, (a) a recording member having a plurality of tracks thereon for storing information and a non-information bearing track thereon;

(b) a transducer;

(c) means for producing relative motion between said member and said transducer to create a layer of air under pressure between said member and said transducer whereby said transducer is adjacent to said member and separated from said member by a film of air;

(d) means for detecting the speed of relative motion between said member and said transducer;

(e) means for positioning said transducer at said non-information bearing track;

(f) means for engaging said transducer with said member, normally separated therefrom by said film of air, when said transducer is at said non-information bearing track and when said relative motion is at a predetermined speed, and for retracting said transducer from said member; and (g) means for translating said transducer along said member; whereby said transducer is engaged with said member at said non-information bearing track prior to its translation to one of said information tracks.

2. The device as claimed in claim 1 wherein said member is a magnetic medium and said transducer is a magnetic head.

3. The device as claimed in claim 1 wherein said member is a cylindrical recording medium adapted to be rotated about its axis and wherein said tracks are located on the cylindrical surface of said medium.

4. The device as claimed in claim 1 wherein said member is a magnetic drum adapted to be rotated about its axis and where said transducer is a magnetic head.

5. A magnetic drum adapted to rotate at a predetermined rate of speed, said drum having circumferential tracks on the surface of said drum, at least one of said tracks containing no information therein, a fiying head adapted to be raised and lowered in cooperation with said drum, a motor for rotating said drum, means for detecting the speed of rotation of said drum, sensing means for determining when said head is at one of said no information tracks, and means for lowernig said head when said drum is rotating at said predetermined speed and said head is at one of said no information tracks.

6. The combination as claimed in claim 5 further comprising means for translating said lowered head at said no information track to another of said circumferential tracks.

7. In combination, a drum having a plurality of information tracks and a non-information landing track about the circumference of said drum, a transducer, a carriage for carrynig said transducer, means for bringing said transducer into and out of engagement with a track on said drum, means for moving said carriage along the length of said drum, means for generating a "present position" signal indicative of the position of said transducer with said drum, means for receiving an "address" signal indicative of a desired information track on said drum, means responsive to an out of engagement condition of said transducer with said drum for generating a "landing track" signal, and a servo network for producing a control signal for said moving means, said network adapted to receive said "present position" signal and a second signal, said second signal being said "address" signal in the absence of said "landing track" signal, said second signal being said "landing track" signal when said "landing track" signal is present.

8. In combination, a magnetic drum having a plurality of information tracks and a non-information landing track about the circumference of said drum, a magnetic head, a carriage for carrying said magnetic head, driving means for moving said carriage along the length of said drum, means for generating a "present position" signal indicative of the position of said head with said drum, means for bringing said head into and out of engagement with said drum, a first electrical circuit for coupling said last named means to a point of reference potential, said electrical circuit when closed causing said latter means to bring said head into engagement with said drum, said electrical circuit when open causing said latter means to bring said head out of engagement with said drum, means for generating a "landing track" signal, means responsive to an address signal for generating an "information track" signal, a second electrical circuit, a servo network coupled to said second electrical circuit and to said means for generating said "present position" signal, said servo network being adapted to provide an error signal in accordance with the differences between a signal from said second electrical circuit and said "present position" signal, said second electrical circuit when closed causing said "information track" signal to be coupled to said servo network, said second electrical circuit when open causing said "landing track" signal to be coupled to said servo network, said error signal being adapted to control said driving means, means for detecting when said driving means is quiescent, means for detecting when said drum is rotating at a desired speed, means for detecting when said carriage is at said landing track, and means operative when said driving means is quiescent, said drum rotating at a desired speed, and said carriage at said landing track for closing said electrical circuits, whereby said head is initially engaged with said drum only at said landing track, and whereby said carriage is translated subsequently to an information track corresponding to said "information track" signal.

9. In combination, (a) a magnetic drum having a plurality of information tracks and a landing track on the cylindrical surface thereof, said drum adapted to be rotated about its axis;

(b) a magnetic head adapted to be placed adjacent to said drum and separated from said drum by a film of air when said drum is rotated, said head being adapted to be retracted away from the surface of said drum;

(c) means for detecting the speed of rotation of said drum;

(d) means for positioning said transducer at said landing track;

(e) means for bringing said head into cooperative engagement with said drum, separated by said film of air, only at said landing track, when said speed of rotation is at a predetermined speed; and (f) means for moving said head from said landing track to one of said information tracks only when said head is cooperatively engaged with said drum and separated from said drum by a film of air.

10. In combination, (a) a cylindrical magnetic drum adapted to be rotated about its axis, said drum having circumferential tracks thereon for the storage of information and a circumferential track thereon for use as a landing track;

(b) a magnetic head;

(c) means for detecting the speed of rotation of said drum;

(d) means for positioning said head at said landing track;

(e) means for flying said head over the cylindrical surface of said drum and for retracting said head away from said surface, said latter means operative to actuate said head into a flying position, from a retracted position, only when said head is adjacent to said landing track and said head is rotating at a predetermined speed; and (f) means for translating said head along the length of said drum, said translating means operative to move said head from said landing track to an information track only when said head is in a flying position.

References Cited by the Examiner

UNITED STATES PATENTS

| | | | |
|---|---|---|---|
| 1,827,051 | 10/31 | Thomas | 274—41.4 |
| 2,886,651 | 5/59 | Vogel. | |
| 2,901,738 | 8/59 | Willard. | |
| 2,972,738 | 2/61 | Sliter. | |
| 3,037,205 | 5/62 | Hagopian. | |

IRVING L. SRAGOW, *Primary Examiner.*

NEWTON N. LOVEWELL, DAVID G. REDINBAUGH, *Examiners.*